United States Patent
Humfeldt et al.

(10) Patent No.: US 8,662,265 B2
(45) Date of Patent: *Mar. 4, 2014

(54) ENERGY ABSORBER FOR AIRCRAFT (75) Inventors: Dirk Humfeldt, Hamburg (DE);
Michael Harriehausen, Hamburg (DE);
Jan Schröder, Hamburg (DE); Martin Sperber, Mönchengladbach (DE);
Michael Demary, Meckenheim (DE)

(73) Assignee: Airbus Operations GmbH (DE)

( * ) Notice: Subject to any disclaimer, the term of this patent is extended or adjusted under 35 U.S.C. 154(b) by 709 days.

This patent is subject to a terminal disclaimer.

(21) Appl. No.: 12/223,829

(22) PCT Filed: Feb. 8, 2007

(86) PCT No.: PCT/EP2007/001082
§ 371 (c)(1),
(2), (4) Date: Aug. 4, 2009

(87) PCT Pub. No.: WO2007/093320
PCT Pub. Date: Aug. 23, 2007

(65) Prior Publication Data
US 2009/0301832 A1    Dec. 10, 2009

Related U.S. Application Data (60) Provisional application No. 60/773,423, filed on Feb. 15, 2006.

(30) Foreign Application Priority Data

Feb. 15, 2006   (DE) .......................... 10 2006 007 030

(51) Int. Cl.
*F16F 7/12*   (2006.01)
(52) U.S. Cl.
USPC ........................................................ 188/371
(58) Field of Classification Search
USPC ............. 188/371, 374–376; 267/136, 140.11, 267/141; 244/110 R, 110 C, 110 F
See application file for complete search history.

(56) References Cited

U.S. PATENT DOCUMENTS

| 3,087,584 A | * | 4/1963 | Jackson et al. ................ 188/372 |
| 3,377,044 A | | 4/1968 | Jackson et al. |
| 3,504,567 A | * | 4/1970 | Ohashi et al. .................... 74/492 |
| 3,938,627 A | * | 2/1976 | Nagazumi ..................... 188/371 |

(Continued)

FOREIGN PATENT DOCUMENTS

| DE | 1480372 | 6/1969 |
| DE | 2213323 | 9/1972 |
| DE | 2642697 | 3/1977 |
| DE | 38 42 791 A1 | 6/1990 |
| DE | 19633469 | 9/1997 |
| DE | 102004042080 | 3/2006 |
| EP | 0252031 | 1/1988 |
| EP | 0767100 | 4/1997 |
| EP | 1 000 822 A2 | 5/2000 |
| EP | 1630098 | 3/2006 |
| FR | 2 375 499 A1 | 7/1978 |
| FR | 2787409 | 6/2000 |
| GB | 1060974 | 3/1967 |
| GB | 1186332 | 4/1970 |
| GB | 1376786 | 12/1974 |
| JP | 48-082619 | 10/1973 |
| JP | 51-039930 | 3/1976 |
| JP | 51-127551 U | 10/1976 |
| JP | 01-108443 | 4/1989 |
| JP | 04-062255 | 2/1992 |
| RU | 2131826 C1 | 6/1999 |
| SU | 652388 A1 | 3/1979 |
| SU | 968535 | 10/1982 |
| WO | 2004/106769 A1 | 12/2004 |
| WO | 2005002676 | 1/2005 |

OTHER PUBLICATIONS

U.S. Appl. No. 12/223,888, filed Nov. 10, 2009.

*Primary Examiner* — Xuan Lan Nguyen
(74) *Attorney, Agent, or Firm* — Lerner, David, Littenberg, Krumholz & Mentlik, LLP (57) ABSTRACT

An energy absorber for aircraft, which includes one or more energy absorber elements and a housing, whereby the energy absorber elements can absorb crash impulses by plastic deformation within the housing. Thus, the load on the primary structure and the respective inboard devices is limited, which can lead to an increased, passive safety of the passengers and a weight reduction.

7 Claims, 9 Drawing Sheets (56) References Cited

U.S. PATENT DOCUMENTS

| | | | |
|---|---|---|---|
| 3,968,863 A | 7/1976 | Reilly | |
| 4,027,905 A * | 6/1977 | Shimogawa et al. | 297/472 |
| 4,346,795 A | 8/1982 | Herbert | |
| 4,978,139 A | 12/1990 | Andres et al. | |
| 5,108,048 A | 4/1992 | Chang | |
| 5,542,626 A | 8/1996 | Beuck et al. | |
| 5,664,807 A | 9/1997 | Bohmler | |
| 5,669,633 A * | 9/1997 | Naff et al. | 280/777 |
| 5,706,704 A | 1/1998 | Riefe et al. | |
| 6,007,024 A | 12/1999 | Stephan | |
| 6,322,103 B1 | 11/2001 | Li et al. | |
| 6,769,715 B2 | 8/2004 | Riefe et al. | |
| 6,962,245 B2 | 11/2005 | Ray et al. | |
| 8,302,747 B2 * | 11/2012 | Humfeldt et al. | 188/371 |
| 2003/0111310 A1 | 6/2003 | Renton et al. | |
| 2004/0011615 A1 | 1/2004 | Ray et al. | |
| 2004/0232685 A1 * | 11/2004 | Gatti et al. | 280/777 |
| 2009/0301832 A1 | 12/2009 | Humfeldt et al. | |
| 2010/0096230 A1 | 4/2010 | Humfeldt et al. | |

* cited by examiner

ENERGY ABSORBER FOR AIRCRAFT

REFERENCE TO RELATED APPLICATIONS

This application claims the benefit of German Patent Application No. 10 2006 007 030.5 filed Feb. 15, 2006, and of U.S. Provisional Application No. 60/773,423 filed Feb. 15, 2006, the disclosures of which are hereby incorporated herein by reference.

FIELD OF THE INVENTION

The present invention relates to energy absorbers for aircraft. In particular, the present invention relates to an energy absorber for an aircraft, the use of such an energy absorber in an aircraft, and a method for energy absorption in an aircraft.

TECHNOLOGICAL BACKGROUND OF THE INVENTION

In aircraft, holders or attachment elements for holding and attaching inboard devices, such as ceiling liners, overhead bins, or monuments, are used. In the case of rigid attachment elements, in particular in the event of intense accelerations, such as those that can occur in the event of severe turbulence or for example, also with an emergency landing, the resulting acceleration forces may be transmitted directly from the primary structure of the aircraft over the holder to the attached inboard device. Likewise, all forces or accelerations acting on the inboard device may be transferred directly via the holder or the holder system to the aircraft structure.

Holders and the inboard devices attached thereto may be statically placed on the basis of static load or maximum service loads. A breakdown of the holder, such as for example, by breaking or bursting out from the inboard device based on excessive acceleration forces can occur, which may lead to damage to the holder, the inboard device, or the primary structure of the aircraft and further, may endanger or injure the passengers or lead to impairment with a possible evacuation.

SUMMARY OF THE INVENTION

It may therefore be desirable to have an energy absorber for aircraft, which provides a secure attachment of inboard devices or other devices of the aircraft, also under intense mechanical loads.

According to an exemplary embodiment of the present invention, an energy absorber for an aircraft is provided, the energy absorber comprising a first energy absorber element and a second energy absorber element, both for absorption of an acceleration energy or acceleration forces resulting therefrom by plastic deformation (or force limitation), and a housing, whereby the plastic deformation of the energy absorber element takes place within the housing and whereby the second energy absorber element is arranged parallel to the first energy absorber element and abuts flat on the first energy absorber element.

By means of the energy absorber elements, which are integrated at least partially in the housing, the mechanical load on the inboard device, which is connected by the energy absorber with a primary structure of the aircraft, and which can be, for example, a luggage bin mounted over the passengers, may be limited. For example, the energy absorber may be designed for absorbing acceleration energy resulting from movement of the aircraft. By absorbing acceleration energies, the force transmissions from the primary structure of the aircraft to the inboard device or from the inboard device to the primary structure may be reduced. This may lead to an increased passive safety in the cabin. In addition, by using the energy absorber of the present invention with energy absorber elements, the construction of the inboard device may be designed in a material- or weight-savings manner, since the maximally occurring mechanical loads may be reduced. This may permit a weight-optimization of all components involved on the load curve (for example, inboard components, holder, and primary structure). In addition, with a statically overruled system, a uniform load distribution may be made possible, in particular with a structure deformed by load.

By the use of multiple energy absorber elements, which are arranged parallel to one another and lie flat on one another (i.e. abut each other), the force levels may be increased. At the same time, the existing space may be better used and the differently positioned energy absorber elements (for example, in the form of sheets) affect a more favorable force distribution on the deck layers by the now existing two force lines.

Thus, with the energy absorber of the present invention, crash impulses, like those that can occur with an emergency landing, may at least partially be absorbed. The resulting force impact accordingly may not be transferred completely to the inboard device, rather damped additionally or absorbed partially to a defined force level, so that malfunction may be prevented.

By the principle of plastic deformation, it may further be possible to absorb multiple crash impulses, and in the forward as well as in the reverse direction. In other words, the energy absorber may work in two directions (specifically, are extracted from the housing and displaced into the housing) and thereby absorb impacts in different directions.

According to a further embodiment of the present invention, the second energy absorber element is inlaid in the first energy absorber element.

In this manner, it may be ensured that an absorbed force is distributed better on the housing.

According to a further embodiment of the present invention, the energy absorber further includes a third energy absorber element and a fourth energy absorber element, whereby the third energy absorber element is inlaid in the fourth energy absorber element and whereby the third energy absorber element and the fourth energy absorber element are arranged adjacent to the first energy absorber element and second energy absorber element, so that both the energy absorber pairs are braced against one another with a rolling motion. The outwardly acting forces may be reduced, such that (with suitable construction) a separate housing may be eliminated and may be integrated in the geometry (for example, honeycomb plates with hatrack) to be held.

Here, there may be no surfaces which are subject to friction.

According to a further embodiment of the present invention, the housing includes a first cover plate or cover sheet, a second cover plate or cover sheet, and a fixed support for the second energy absorber element and the first energy absorber element.

According to a further embodiment of the present invention, the first energy absorber element has a longitudinal slit, whereby the housing further has an intermediate wall, which is mounted in the area of the slit.

By slitting the sheet and the division of the housing by the intermediate walls into multiple chambers made possible thereby, the maximum forces on the deck layers may be reduced substantially.

According to a further embodiment of the present invention, the energy absorber further includes a first attachment area and a second attachment area, whereby the first attachment area is designed for attachment of the energy absorber to the primary structure and whereby the second attachment area is designed for attachment of the energy absorber to the inboard device.

The attachment areas may make possible, for example, a simple assembly. In this regard, the energy absorber first may be fixedly mounted to a hull- or deck surface or to a support element of the primary structure. Next, then, an inboard device element is connected permanently at the second attachment area with the energy absorber.

According to a further exemplary embodiment of the present invention, the attachment of the energy absorber to the primary structure or to the inboard device takes place by means of a force- or positive-locking connection.

Therefore, an energy absorber may be provided, for example, which may be mounted simply. The first attachment region, for example, additionally may have a profile, for example, in the form of a claw element, which is inserted onto a rectangular section of a support. In this regard, the claw element may be designed, for example, such that the energy absorber is held to the support with this insertion so that its fixed weight is held. For final attachment of the energy absorber, the energy absorber then may be fixed by means of screws, rivets or self-locking pins or similar means to the support.

According to a further exemplary embodiment of the present invention, the energy absorber further has an adjustment element. The adjustment element may change the bending radius of the energy absorber element and therewith, the lever arm. In this manner, a change of the force level may be provided (variable constant performance level as well as progressive or declining performance is thus adjustable).

In this manner, the force progression may be freely adjusted by continuous change of the cover sheet distance.

In addition, the force-path progression may be adapted individually by a contour adaptation of the cover sheet. In addition, the energy absorber itself may be structured or contoured, in order to individually adjust a further adaptation of the force-path progression.

For example, the cover sheet may have a bulge or hump, so that the energy absorber element can be forced to an additional bending, which affects likewise the force level.

According to a further exemplary embodiment of the present invention, the energy absorber has an energy absorption direction, whereby first upon exceeding of a minimal force (force limiting), which acts in the direction of the energy absorption direction, an energy absorption occurs through the energy absorber.

The inner device (or the like) may be supported substantially fixedly with correspondingly minimal load, so that it is suitable for normal on-board operation. With increased load, such as through an intense impact of force, a damping is established, in which for example, the energy absorber is pulled in the absorption direction from the housing (or is pushed into the housing). In this manner, correspondingly intense force impacts may be effectively absorbed.

According to a further exemplary embodiment of the present invention, the use of an energy absorber in an aircraft is provided.

According to a further exemplary embodiment of the present invention, a method for energy absorption in an aircraft is provided, including a pulling out of a first energy absorber element and a second energy absorber element from the housing, and an absorption of an acceleration energy by plastic deformation of the first energy absorber element and of the second energy absorber element within the housing during the pulling out, whereby the second energy absorber element is arranged parallel to the first energy absorber element and lies flat on this, i. e. abuts the first energy absorber element.

Further objects and embodiments of the invention are provided in the dependent claims.

Next, the invention will be described in greater detail with regard to exemplary embodiments in reference to the drawings.

DETAILED DESCRIPTION OF EXEMPLARY EMBODIMENTS

In the following description of the figures, the same reference numerals are used for the same or similar elements.

The representations in the figures are schematic and not to scale.

Figure 1A:
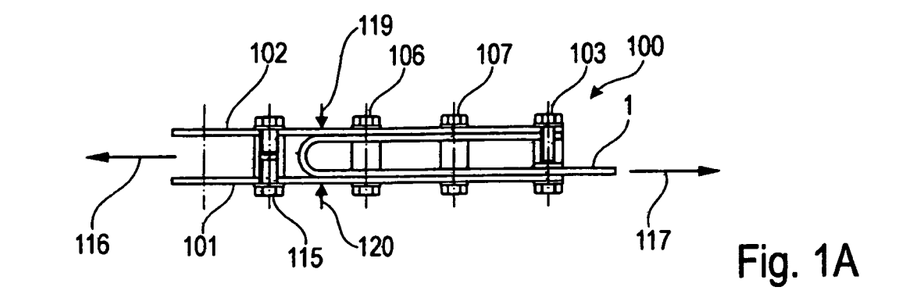
FIG. 1A shows a schematic cross-sectional representation of the energy absorber according to one exemplary embodiment of the present invention.

FIG. 1A shows a schematic cross-sectional representation of an energy absorber according to an exemplary embodiment of the present invention. The energy absorber 100 has a lower housing region 101 and an upper housing region 102, between which the energy absorber element is mounted.

The energy absorber 100, in which this energy absorber elements 1 are installed, is subdivided basically into so-called single deckers with a sheet or with multiple sheets placed in one another and so-called multiple deckers with two or more sheets running opposite to one another (which can comprises respectively again multiple sheets placed in one another).

Thus, multiple sheets can be nested in one another, in order to achieve for example an optimization of the cover layer load, better volume use or increased force level.

In addition, the energy absorber 100 includes a fixed support 103 for the energy absorber element 1 and force impact points 105-112, 115.

Figure 1B:
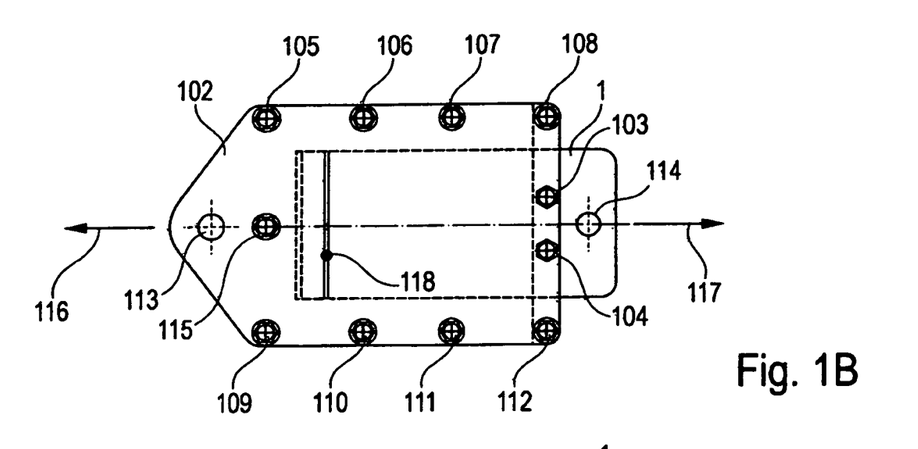
FIG. 1B shows a schematic representation of the energy absorber of FIG. 1A in plan view.

FIG. 1B shows the energy absorber of FIG. 1A in a representation rotated at 90°. The upper housing part or double-decker sheet 102 has a bore 113 for attachment, for example, to the primary structure of the aircraft. The energy absorber element 1 has a bore 114 for attachment, for example, to an inboard device part of the aircraft. If a force acts now on the housing in the direction of the arrow 116 and a force acts on the absorber element 1 in the opposite direction 117, then the absorber element is pulled out from the housing by plastic deformation upon exceeding a known minimal force. Thus, energy is absorbed.

The absorption functions also in the reverse direction, as specifically the energy absorber element 1 is pressed into the housing. The first impact points 105 to 112 and 115 serve on the one hand for connection of the cover sheets 101, 102 and for distribution of the occurring forces (symbolized by force line 118 and arrows 119, 120).

The structure shown in FIG. 1 represents the basic form o the single decker. Here, the energy absorber element 1 is braced against the cover layers 101, 102 and is transformed upon reaching the trigger force.

Figure 2A:
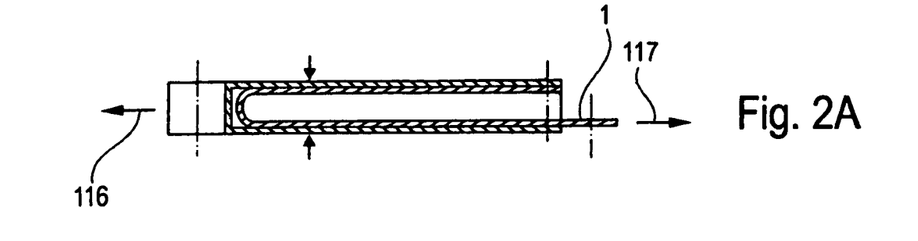
FIG. 2A shows a schematic cross-sectional representation of an energy absorber according to a further exemplary embodiment of the present invention.
Figure 2B:
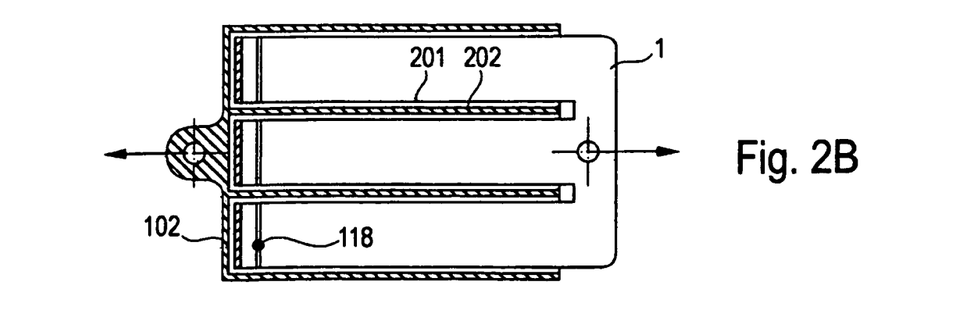
FIG. 2B shows a further schematic cross-sectional representation of the energy absorber of FIG. 2A.

FIGS. 2A, 2B shows cross-sectional representations of an energy absorber according to a further exemplary embodiment of the present invention. This structure is principally designed like the structure in FIG. 1. By means of the slots of the sheet 1 and the subdivision of the housing 102, 101 made possible in this manner by intermediate walls 202 into multiple chambers, the forces may be greatly reduced or uniformly distributed. Reference numeral 201 represents a slot in the sheet, in which an intermediate wall 202 runs.

Figure 3A:
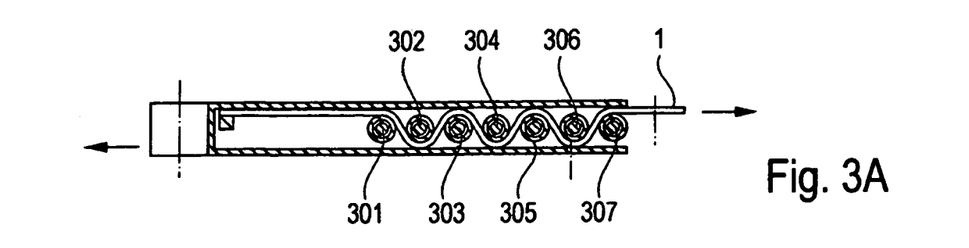
FIG. 3A shows a schematic cross-sectional representation of an energy absorber according to a further exemplary embodiment of the present invention.
Figure 3B:
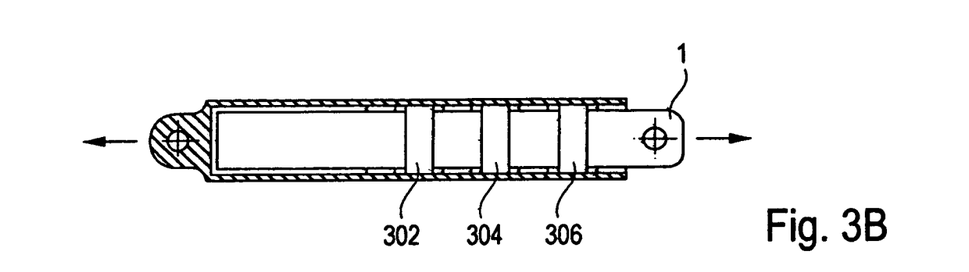
FIG. 3B shows a further schematic cross-sectional representation of the energy absorber of FIG. 3A.

FIGS. 3A, 3B show a further energy absorber according to a further exemplary embodiment of the present invention in two cross-sectional representations. This structure can be viewed as an independent deformation principle. Since here, however, preferably only one energy absorber element 1 is deformed, this structure is attributed likewise to the single-decker. The sheet is passed around multiple times around rollers 301, 302, 303, 304, 305, 306, 307. The rollers should be designed to be rotatable, in order to hold the frictional effect at a minimum.

Figure 4A:
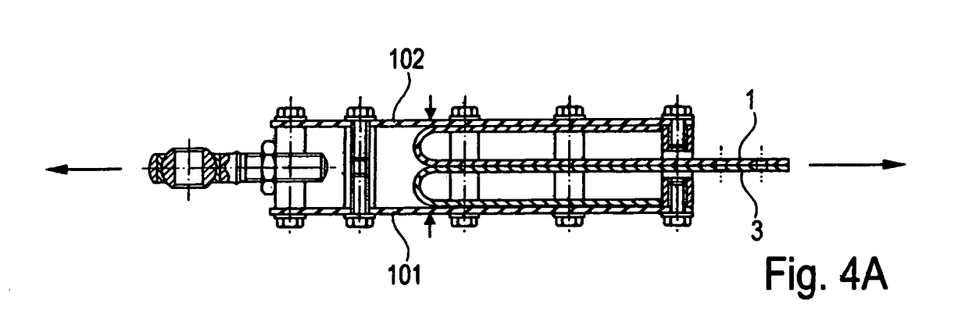
FIG. 4A shows a schematic cross-sectional representation of a further energy absorber according to a further exemplary embodiment of the present invention.
Figure 4B:
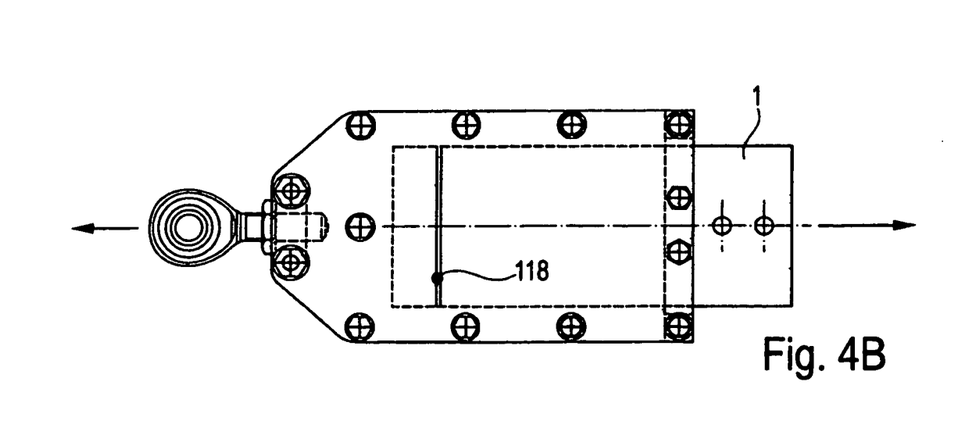
FIG. 4B shows a further schematic cross-sectional representation of the energy absorber of FIG. 4A.

FIGS. 4A, 4B show an energy absorber according to a further exemplary embodiment of the present invention, which belongs to the structure "double deck".

Here, the first energy absorber element 1 is braced on one side against the cover layer 102. A second energy absorber element 3 is provided, which is braced on the other side against the lower cover layer 101. The energy absorber elements 1, 3 are deformed upon reaching the tripper force and roll against one another.

Figure 5A:
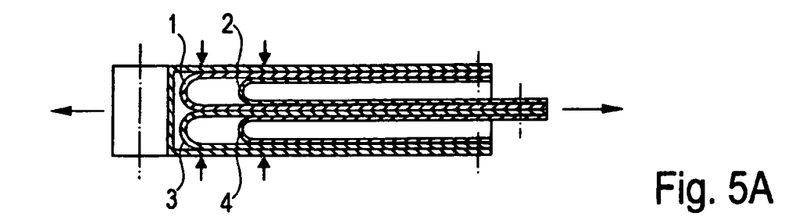
FIG. 5A shows a schematic cross-sectional representation of an energy absorber according to a further exemplary embodiment of the present invention.
Figure 5B:
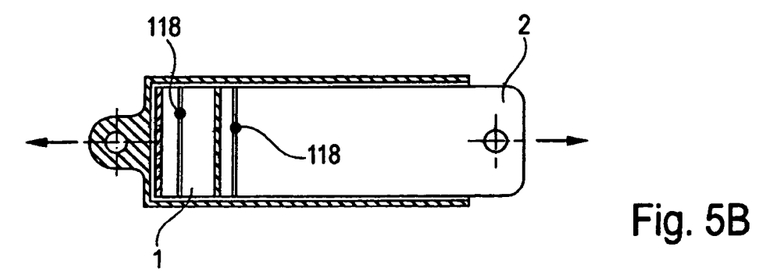
FIG. 5B shows a further schematic cross-sectional representation of the energy absorber of FIG. 5A.

FIGS. 5A, 5B shows an energy absorber according to a further exemplary embodiment of the present invention. This structure is designed principally like the structure of FIG. 4. By the placement of two or more sheets 1, 2 or 3, 4, the force level can be increased. For example, larger loads can therefore be absorbed. At the same time, one uses the space better and the differently positioned sheets affect a favorable force distribution on the cover layers or cover plates 101, 102 through the now existing two force lines 118.

Figures 6A, 6C:
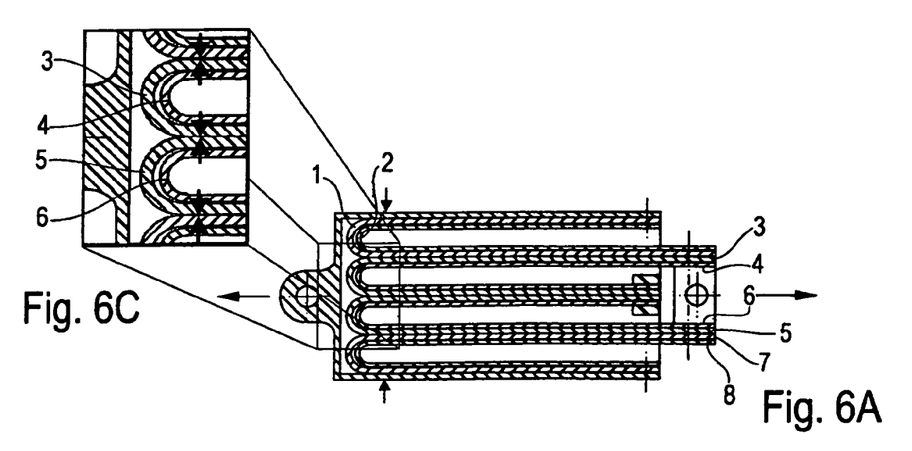
FIG. 6A shows an energy absorber in a schematic cross-sectional representation according to an exemplary embodiment of the present invention.
FIG. 6C shows a detail enlargement of a region of the energy absorber of FIG. 6A.
Figure 6B:
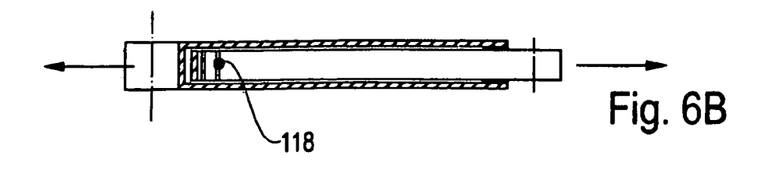
FIG. 6B shows a further schematic cross-sectional representation of the energy absorber of FIG. 6A.

FIGS. 6A, 6B, 6C shows a further embodiment of the energy absorber. Here, respectively, two (or more) sheets are placed in one another (1, 2 or 3, 4 or 5, 6 or 7, 8). In addition, the different groups of inlaid sheets are placed respectively over one another. The sheet pair 1, 2 is braced with a rolling motion against the sheet pair 3, 4 and the sheet pair 5, 6, is braced with a rolling motion against the sheet pair 7, 8.

The structural space here is used very favorably. The multiple sheets lying over one another acts by their arrangement itself like cover sheets and reduced therefore the forces acting on the cover layers 101, 102.

In addition, through the adjacent placement of such sheets, the thickness of the energy absorber 100 (that is, the spacing of both cover sheets 101, 102) with constant force progression may be reduced. This could enable an integration of the energy absorber in a sandwich palette, for example, which can result in turn in reduction of the housing.

Figure 7A:
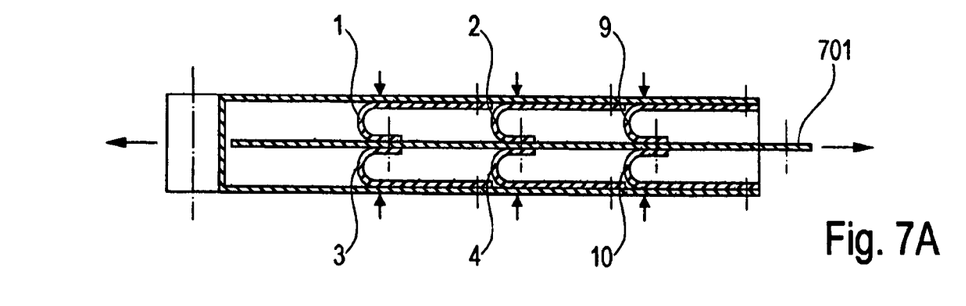
FIG. 7A shows a schematic cross-sectional representation of an energy absorber according to a further exemplary embodiment of the present invention.
Figure 7B:
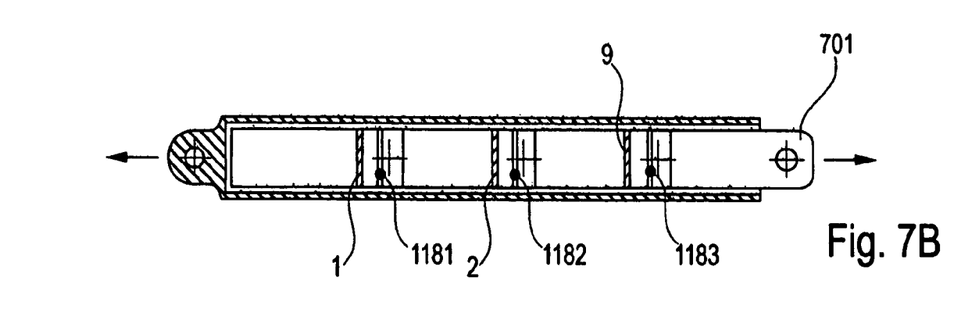
FIG. 7B shows a further schematic cross-sectional representation of the energy absorber of FIG. 7A.

FIGS. 7A, 7B show an energy absorber according to a further exemplary embodiment of the present invention. This structure is designated by a slim design. Here, the individual energy absorber elements 1, 2, 3, 4, 9, 10 are connected to one another via a central tension rod 701. The differently positioned sheets affect a favorable force distribution on the cover layers 101, 102 through the now existing three force lines 1181, 1182, 1183.

FIGS. 8A through 9D show an energy absorber with an adjustment element according to a further exemplary embodiment of the present invention. The force progression may be adjusted freely by continuous change of the cover plate distance. This adjustment element system can be used for the single decker principle as well as for the double or multiple decker principle.

Figure 8A:
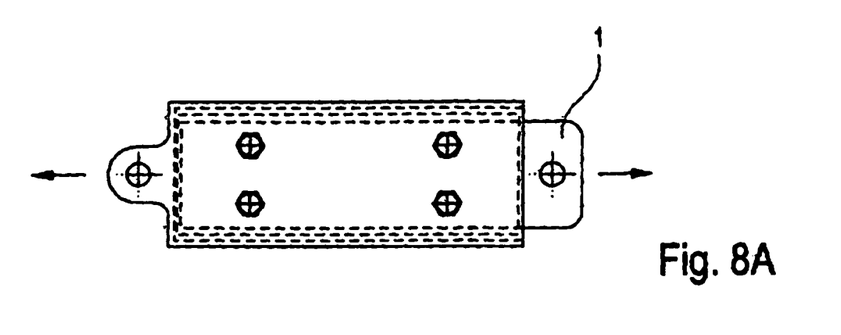
FIG. 8A shows a schematic cross-sectional representation of an energy absorber with an adjustment element according to a further exemplary embodiment of the present invention.
Figure 8B:
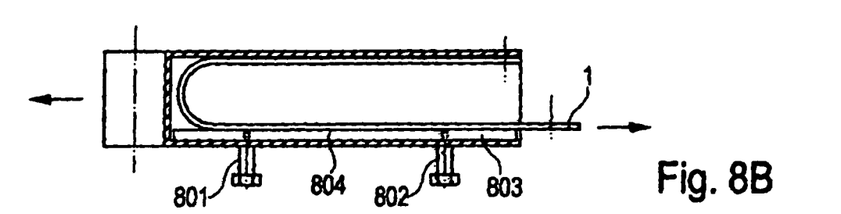
FIG. 8B shows a further schematic cross-sectional representation of the energy absorber of FIG. 8A.

The adjustment element system includes a first adjustment element 801, a second adjustment element 802, and a cover plate 803, which can be displaced by actuation of both adjustment elements 801, 802.

By actuation of the adjustment elements 801, 802, the cover plate 803 can be displaced, such that the energy absorber element 1 is squeezed together more or less intensely.

Figure 8C:
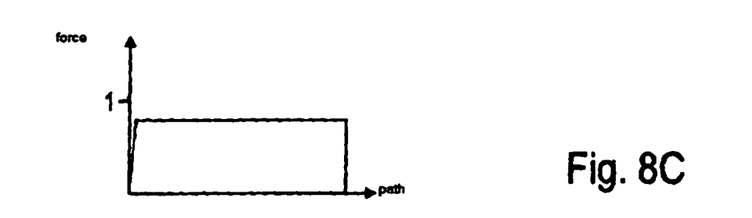
FIG. 8C shows an exemplary force-path-progression of the energy absorber according to the configuration of FIGS. 8A, 8B.

In the configuration shown in FIGS. 8A, 8B, the uniform, substantially constant force-path-progression of FIG. 8C is provided.

Figure 8D:
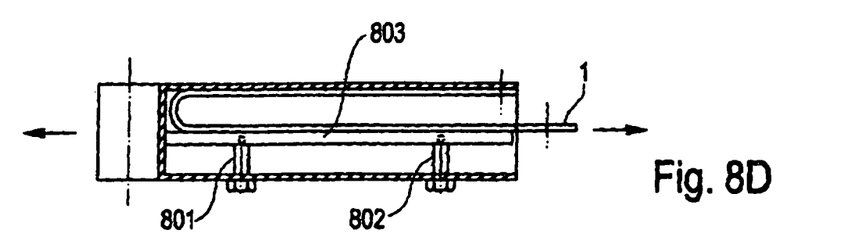
FIG. 8D shows the energy absorber of FIGS. 8A, 8B with an actuated adjustment element.
Figure 8E:
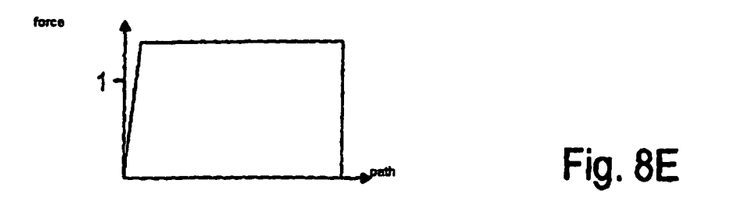
FIG. 8E shows a corresponding force-path-progression of the energy absorber according to the configuration of FIG. 8D.

In the position shown in FIG. 8D (here the adjustment elements 801, 902 are screwed in more strongly, so that the cover plate 803 presses together the energy absorber element 1 more strongly), the force-path-progression shown in FIG. 8D is provided (at higher level than in FIG. 8C).

Figure 9A:
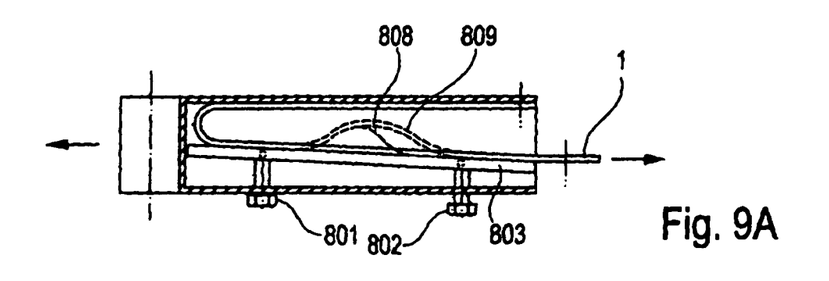
FIG. 9A shows an energy absorber with an adjustment element according to a further exemplary embodiment of the present invention.
Figure 9B:
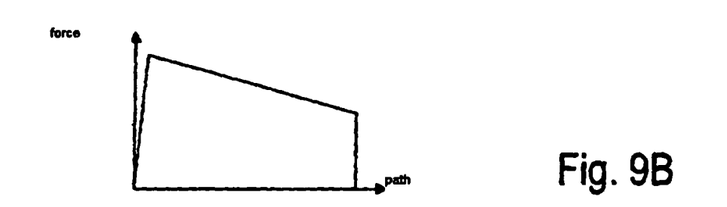
FIG. 9B shows a corresponding force-path-progression of the energy absorber according to the configuration of FIG. 9A.

In the position shown in FIG. 9A, in which the cover plate 803 is positioned inclined, the force progression shown in FIG. 9B is provided. Here, after expenditure of a minimal force, the force progression is not constant, rather decreases upon pulling out of the strip 1. On the contrary, the force progression increases upon pushing in of the strip.

The cover plate 803 also can have a different form, for example, a hump or bulge 808, which leads to bending of the sheet 1 still further in the region 809, thereby changing the force-path-progression accordingly.

Figure 9C:
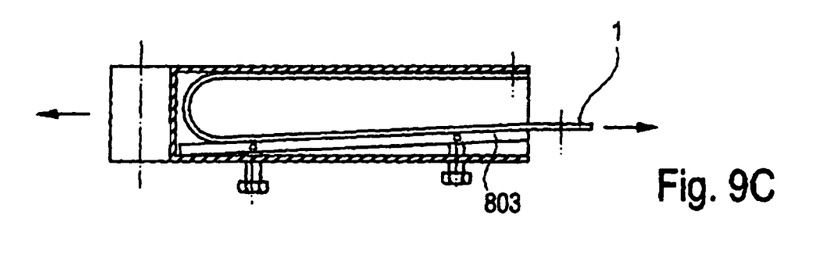
FIG. 9C shows the energy absorber of FIG. 9A with a different actuated adjustment element.
Figure 9D:
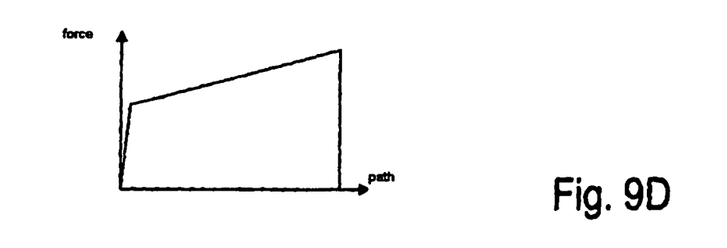
FIG. 9D shows the corresponding force-path-progression of the energy absorber according to the configuration of FIG. 9C.

In the configuration shown in FIG. 9C, a reverse force progression (see FIG. 9D) is provided, in which upon pulling out of the sheet or plate 1, the force expended therefore increases (and vice versa).

FIGS. 10A through 11D show a double decker system with adjustment elements 801, 802, 805, 806 and cover plates 803, 807.

Figure 10A:
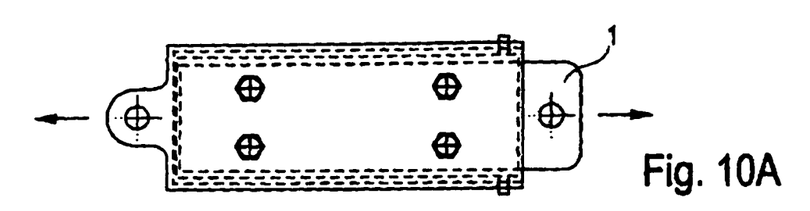
FIG. 10A shows an energy absorber with an adjustment element according to a further exemplary embodiment of the present invention.
Figure 10B:
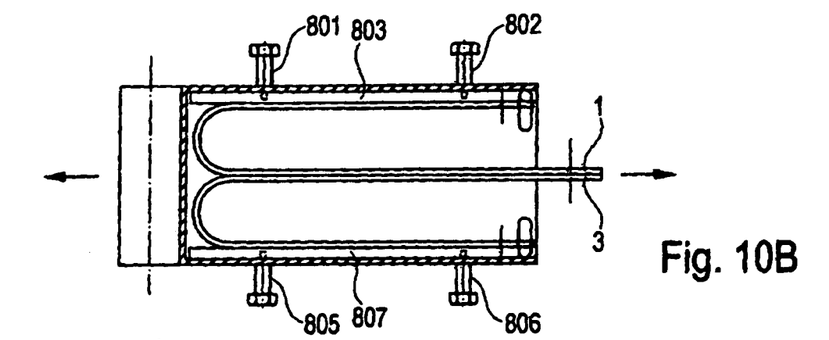
FIG. 10B shows the energy absorber of FIG. 10A in a further cross-sectional representation.
Figure 10C:
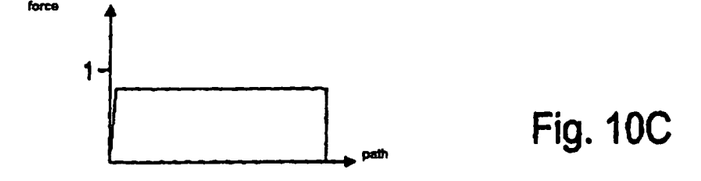
FIG. 10C shows the corresponding force-path-progression of the energy absorber according to the configuration of FIGS. 10A, 10B.
Figure 10D:
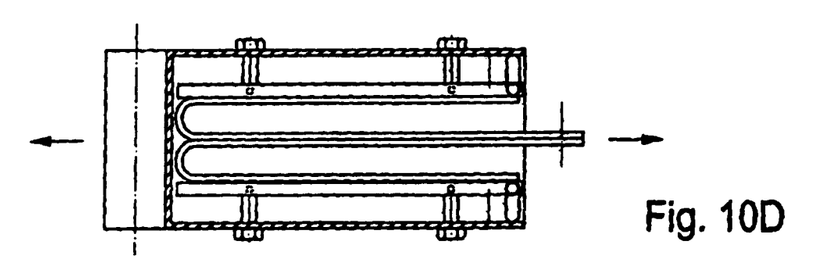
FIG. 10D shows the energy absorber of FIG. 10A with actuated adjustment elements.

The force progression resulting from the configuration of FIGS. 10A, 10B is shown in FIG. 10C. The force progress constantly here upon pulling out or pushing in of the sheet 1, 3.

Figure 10E:
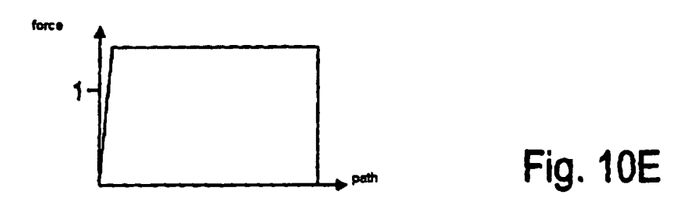
FIG. 10E shows the corresponding force-path-progression of the energy absorber according to the configuration of FIG. 10D.

If the adjustment elements 801, 802, 805, 806 are screwed in (see FIG. 10D), an increased force progression is provided (see FIG. 10E).

Figure 11A:
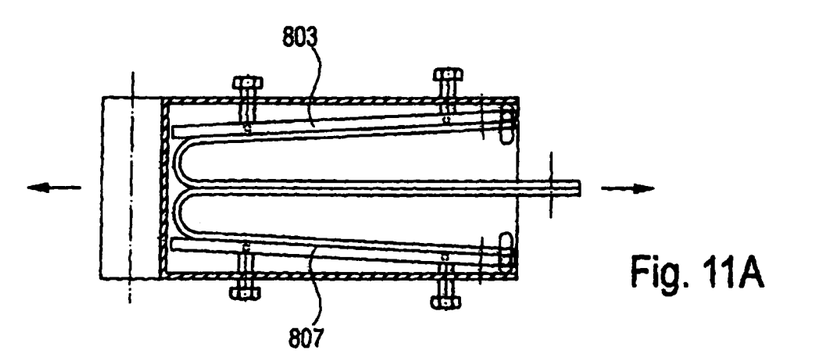
FIG. 11A shows an energy absorber with actuated adjustment elements according to a further exemplary embodiment of the present invention.
Figure 11B:
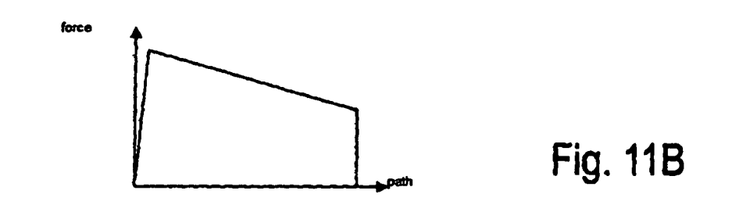
FIG. 11B shows the corresponding force-path-progression of the energy absorber according to the configuration of FIG. 11A.

If the adjustment elements are screwed in strongly in a different manner, as shown in FIG. 11A, a force progression that decreases upon pulling out is provided (see FIG. 11B).

Figure 11C:
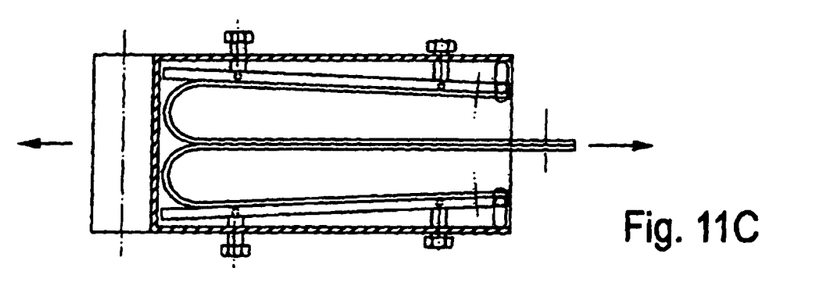
FIG. 11C shows a further energy absorber with actuated adjustment elements according to a further exemplary embodiment of the present invention.
Figure 11D:
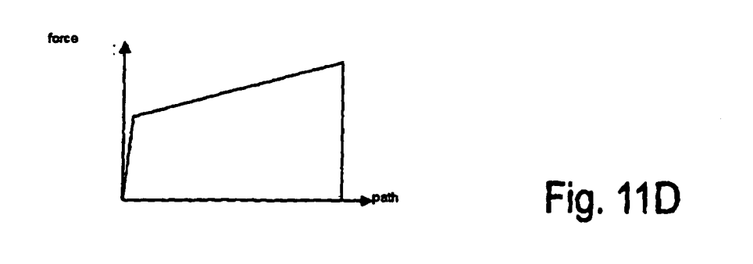
FIG. 11D shows the force-path-progression of the energy absorber according to the configuration of FIG. 11C.
Figure 12A:
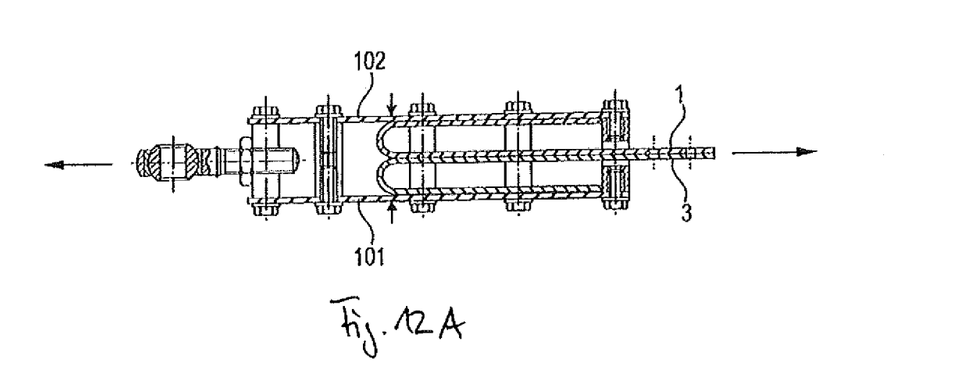
FIG. 12A shows a schematic cross-sectional representation of a further energy absorber according to a further exemplary embodiment of the present invention.
Figure 12B:
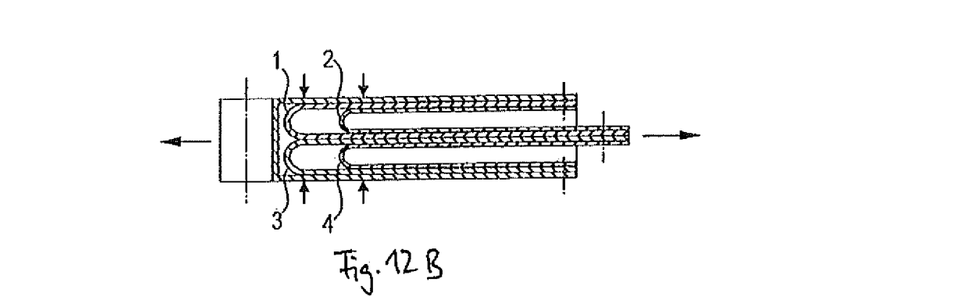
FIG. 12B shows a schematic cross-sectional representation of a further energy absorber according to a further exemplary embodiment of the present invention.
Figure 12C:
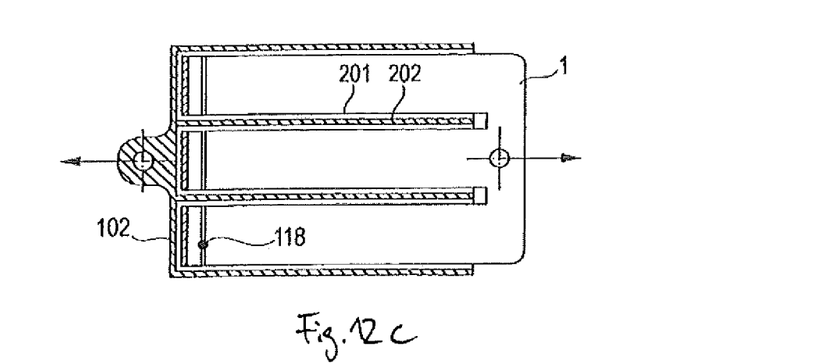
FIG. 12C shows a further schematic cross-sectional representation of the energy absorbers of FIGS. 12A and 12B.

If in contrast the adjustment elements are screwed opposite to the configuration of FIG. 11A (see FIG. 11C), an increased force progression is provided upon pulling out of the strip 1, 2 (see FIG. 11D).

The adjustment elements can be positioned also via hydraulic tappet rods, eccentric disks or electric adjustment drive instead of by screws (see FIGS. 11A and 11C).

Thus, the force level of the absorption can be adjusted also very quickly and/or by automation to the individual situation.

Naturally, also the use of other materials is possible, for example flexible, deformable plastics or other flexible, deformable materials/material mixtures.

The shown energy absorber can also be used as an energy absorber in so-called tie-rods. Further applications are, for example:

Energy absorber in tie rods of hatrack chains. A particular effect is the transfer of forces of the released holder onto the hatrack arranged in front of it and therewith a redundancy potential of this retaining concept. Essentially, these principles are useable where a permanent, positive force-fit connection (defined kinematically) is required.

Energy absorber in undercarriages.

Energy absorber with belt systems.

Energy absorber in rudder linkage for large landing flaps and rudders.

Energy absorber fro seats.

Energy absorber with the securing of freight.

Integration of energy absorbers in the attachment points of monuments of the cabin.

Energy absorber for APUs, in particular for attachment of the APU ("Auxiliary Power Unit").

Energy absorber for separating walls or aircraft arrester nets.

By changing the geometry of the absorber elements, the bending radius and the material properties, the force levels may be varied. In addition, the force level is adjustable by changing spacing of the cover plates. A permanent frictional connection may exist. The system may be impervious to environmental conditions. In addition, the system may be insensitive to diagonal pull (that is, for example, diagonal with reference to the arrow in FIG. 9A), which can occur for example with a crash by deformation of the primary structure. Here, a relative displacement of elements/components can occur, which could have as a result a deviation in the pullout direction.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

The invention claimed is:

1. An energy absorber for an aircraft, the energy absorber comprising:

a first energy absorber element and a second energy absorber element, both for absorption of an acceleration energy by plastic deformation; and a housing including a first cover plate and a second cover plate parallel to the first cover plate, wherein the energy absorber elements are configured to undergo plastic deformation within the housing between the first cover plate and the second cover plate; and wherein the second energy absorber element is arranged parallel to the first energy absorber element and abuts the first energy absorber element;

wherein the first energy absorber element comprises a first longitudinal slit;

wherein the second energy absorber element comprises a second longitudinal slit; and wherein the housing further comprises an intermediate wall arranged in the area of the first and second longitudinal slits, the intermediate wall substantially extending between the first cover plate and the second cover plate and subdividing the housing into at least first and second chambers.

2. The energy absorber of claim 1, wherein the second energy absorber element is inlaid in the first energy absorber element.

3. The energy absorber of claim 2, further comprising:

a third energy absorber element and a fourth energy absorber element;

wherein the third energy absorber element is inlaid in the fourth energy absorber element; and wherein the third energy absorber element and the fourth energy absorber element are arranged adjacent to the first energy absorber element and second energy absorber element, so that the first energy absorber element is braced against the fourth energy absorber element during a rolling motion.

4. The energy absorber of claim 1, further comprising:

a first attachment region; and a second attachment region;

wherein the first attachment region is configured for attachment of the energy absorber to a primary structure; and wherein the second attachment region is configured for attachment of the energy absorber to an inner device of the aircraft.

5. The energy absorber of claim 4, wherein the energy absorber is configured to be attached to the primary structure or to the inner device via one or more of screws, rivets, or self-locking locking pins.

6. The energy absorber of claim 1, wherein the energy absorber has an energy absorption direction; and wherein upon exceeding of a threshold force, which acts in the direction of the energy absorption direction, an energy absorption occurs through the energy absorber.

7. An aircraft comprising an energy absorber, the energy absorber comprising:

a first energy absorber element and a second energy absorber element, both for absorption of an acceleration energy by plastic deformation; and a housing including a first cover plate and a second cover plate parallel to the first cover plate;

wherein the energy absorber elements are configured to undergo plastic deformation within the housing; and wherein the second energy absorber element is arranged parallel to the first energy absorber element and abuts the first energy absorber element;

wherein the first energy absorber element comprises a first longitudinal slit;

wherein the second energy absorber element comprises a second longitudinal slit; and wherein the housing further comprises an intermediate wall arranged in the area of the first and second longitudinal slits, the intermediate wall substantially extending between the first cover plate and the second cover plate and subdividing the housing into at least first and second chambers.

* * * * *